United States Patent [19]
son Åkerberg

[11] Patent Number: 6,061,343
[45] Date of Patent: May 9, 2000

[54] METHOD AND DEVICE TO DETERMINE THE TRANSMISSION POINT IN TIME OF A FIRST TRANSFER IN RELATION TO ANOTHER TRANSFER IN A RADIO MEDIUM

[75] Inventor: Dag E. son Åkerberg, Ekhammarsvägen, Sweden

[73] Assignee: Telefonaktiebolaget LM Ericsson, Stockholm, Sweden

[21] Appl. No.: 08/951,673

[22] Filed: Oct. 16, 1997

[30] Foreign Application Priority Data

Oct. 17, 1996 [SE] Sweden ................................. 9603829

[51] Int. Cl.⁷ ................................. H04J 3/00; H04J 3/06
[52] U.S. Cl. ........................... 370/345; 370/350; 370/508
[58] Field of Search ..................... 370/336, 337, 370/345, 350, 503, 507, 508; 455/349, 454

[56] References Cited

U.S. PATENT DOCUMENTS 5,428,819  6/1995  Wang et al. .............................. 455/454
5,867,492  2/1999  Dellaverson ............................. 370/349

FOREIGN PATENT DOCUMENTS 0578506  12/1994  European Pat. Off. .
8316964  11/1996  Japan .
9302067  12/1994  Sweden .
96/08901  3/1996  WIPO .

OTHER PUBLICATIONS

"Cellular Digital Packet Data System Specification" Release 1.1, Jan. 19, 1995.

*Primary Examiner*—Hassan Kizou
*Assistant Examiner*—John Pezzlo
*Attorney, Agent, or Firm*—Burns, Doane, Swecker & Mathis, L.L.P.

[57] ABSTRACT

The transmission points are determined in time for an asynchronous transfer of information (speech/data) in relation to a synchronous information transfer so that the asynchronous transmission does not coincide with the synchronous reception. The asynchronous and the synchronous reception take place at short distances, e.g., less than 200 m, and the terminals are arranged close to each other and can therefore disturb each other. The frequency band of one terminal is also close to the frequency band of the second terminal. In the asynchronous terminal, the relative times are stored for transmission and reception regarding the synchronous terminal. A procedure is stored in the asynchronous terminal, which, during a predetermined time interval before each synchronous transmission, detects if and when transmission occurs from the synchronous terminal and if the detected signal power exceeds a predetermined threshold value. If the levels in the previous step exceed the predetermined threshold value, the transmission from the asynchronous terminal is timed so that is does not disturb the communication of the synchronous terminal by not coinciding with the reception at the synchronous terminal.

8 Claims, 3 Drawing Sheets

METHOD AND DEVICE TO DETERMINE THE TRANSMISSION POINT IN TIME OF A FIRST TRANSFER IN RELATION TO ANOTHER TRANSFER IN A RADIO MEDIUM

TECHNICAL FIELD

The present invention relates in general terms to a method for determining the transmission point in time of a first transfer of information according to a first rule in relation to a second transfer according to a second rule in a radio medium.

More specifically the invention relates to a method for determining the transmission point in time for an asynchronous transmitter, transmitting in a frequency band near a second frequency band in which rules for synchronous radio transfer are applied. The synchronous radio system may be a radio system of DECT type, that is, a cordless personal communication system with a relatively short range, and the asynchronous system, for example, a so called packet switched data transfer system.

BACKGROUND

In digital radio communication distinction may be made between asynchronous and synchronous transfer. In the following, asynchronous and synchronous systems will be discussed, especially when the transfer takes place over short distances (up to approximately 200 m), for example within an office building in which devices for both transfer types are found in the office rooms.

Traditionally, digital radio communication has been provided in the air interface for synchronous radio terminals such as mobile telephones and digital cordless telephones with speech communication and ISDN services. Common to these types of systems is that the information is transmitted to a certain receiver within certain determined points in time in time division systems on a given radio frequency. Examples of time division systems are the so called TDMA (Time Division Multiple Access) systems in which information is transmitted in time slots at predetermined periodic distances in time for each channel on a certain carrier frequency.

In this case, two communication directions, often referred to as uplink and downlink can use carrier frequencies in different frequency bands, as is the case in cellular mobile telephony systems, in which the spacing between the uplink and downlink frequencies is usually 45 MHz. There is also a variant of TDMA called Multi Carrier Time Division Multiple Access/Time Division Duplex (MCTDMA/TDD) in the following called TDD. In this variant of TDMA the same carrier frequency is used in the uplink and the downlink, but one carrier frequency is used for several duplex channels, as is the case, for example in the DECT system mentioned above, which has 12 time slots in the uplink and 12 in the downlink, a total of 24 time slots on the same carrier frequency.

Radio systems for asynchronous transfer usually use so called packet transfer on a certain radio frequency but these packets are transmitted and received at random points in time from one transceiver to another transceiver.

Examples of asynchronous systems are so called "Local Area Data Networks" which use packet switching, directly on a radio link. A certain frequency spectrum (for example 1910–1920 MHz assigned by the federal commission FCC in the USA) has been reserved for asynchronous radio transfer. In this way the short access time for transmitting asynchronous packets may be made small. Several users in this case share the same frequency spectrum for asynchronous transfer, so that no frequency planning is necessary. On rare occasions, collisions, and thus blocking, occurs in the network between two users, and the packet concerned is retransmitted. Retransmission at certain points in time after transmission of asynchronous data packets is previously known, see, for example that disclosed in SE-A-9302067-5. Synchronous or periodic transfer means that information is transmitted and received at predetermined periodically recurrent points in time, as in the TDMA systems mentioned above. In case of radio transfer over short distances as in the example mentioned above from American standard, the frequency band between 1910 and 1920 MHz is assigned for the asynchronous transfer and the band between 1920 and 1930 MHz is assigned for synchronous transfer. These two bands are thus to be used separately.

When two transceivers are positioned very close to each other, for example on the same desk, and if they use adjacent frequency bands, they can disturb each other. This is valid, for example, for two 10 MHz frequency bands within 20 MHz being used by a synchronous and an asynchronous terminal, respectively, on the same table. It does not help to use carrier frequencies in different frequency bands as a transmission signal is so much stronger than a receive signal that the selectivity in the receive filters is not sufficient to separate the payload signal from the noise when the frequency spacing is less than 10 MHz.

Swedish patent application 9403036-8 describes rules for asynchronous and synchronous transmission of the same kind as is described here. This previous patent application, however, is not intended to solve a problem of interference between terminals located close to each other but describes a method for increasing the frequency accessibility for synchronous systems. Patent application 9403036-8 describes a method used in synchronous radio transfer, in which synchronous transfer has been adapted to the rules for asynchronous transmission so that synchronous transfer can take place in an asynchronous frequency band too, for example in the 1910–1920 MHz band in the USA. This known solution allows synchronized systems to used asynchronous frequency bands as well, but without providing protection from asynchronous terminals nearby. This prior art method is thus suited only when a synchronous system is used, for example, in a building, when it is known that there is no asynchronous system in the building.

Another prior art method is disclosed in "Cellular Digital Packet Data System Specification" Release 1.1, Jan. 19, 1995, which may be obtained from "CDPD Forum" (a well known association of companies in the USA). CDPD uses available frequencies in cellular TDMA mobile telephony systems for the transfer of packet data, that is, only entire available carrier frequencies are used for this purpose, and the spacing between the uplink and downlink frequency bands is 45 MHz.

SUMMARY

A synchronous terminal, for example, of the DECT type may be disturbed by an asynchronous terminal, for example a packet radio connected personal computer PC, if both terminals are placed on the same table, for example, 40 cm apart and if the frequency spacing between the carrier waves of the two terminals is insufficient, for example, less than 10 MHz, since the received signal is drowned by the signal from the transmitter situated close by, which is much stronger It is therefore an object of the present invention to disclose a method for enabling the coexistence of at least one synchronous and one asynchronous radio terminal on the same table when these two terminals use adjacent carrier frequencies (less than 10 MHz frequency spacing), the term coexisting meaning that one of the two terminals can transmit and receive information without being seriously disturbed by the other terminal.

Another object of the present invention is to provide an apparatus in an asynchronous terminal which through addition of rules to the asynchronous protocol serves to eliminate disturbances from the asynchronous terminal to a synchronous terminal situated close by.

The above mentioned objects are achieved according by
storing in the asynchronous terminal the relative times for transmission and reception regarding the synchronous terminal found nearby, storing a procedure in the asynchronous terminal, which during a predetermined time interval before each case of asynchronous communication detects if and when transmission is performed from the synchronous terminal close by and whether or not the detected signal power exceeds a predetermined threshold value, and if the levels according to the previous step exceed the predetermined threshold value regarding the relative times and the detected signal power, letting the asynchronious transmission of the terminal with which the procedure is associated take place, so that it does not disturb the communication of the synchronous terminal by not coinciding in time with the reception in the synchronous terminal.

The above stated objects are also achieved by an apparatus which, as additional equipment in the asynchronous terminal, carries out the method according to the present invention.

The invention is characterized by that listed in the subsequent patent claims.

The invention will be described in more detail with reference to the appended drawings, in which FIG. 1 is a block diagram of two prior art radio systems for synchronous and asynchronous radio transfer, respectively, within the same geographical area;

FIG. 2 schematically shows frequency bands, each assigned to both radio systems according to FIG. 1;

DETAILED DESCRIPTION

Figure 1:
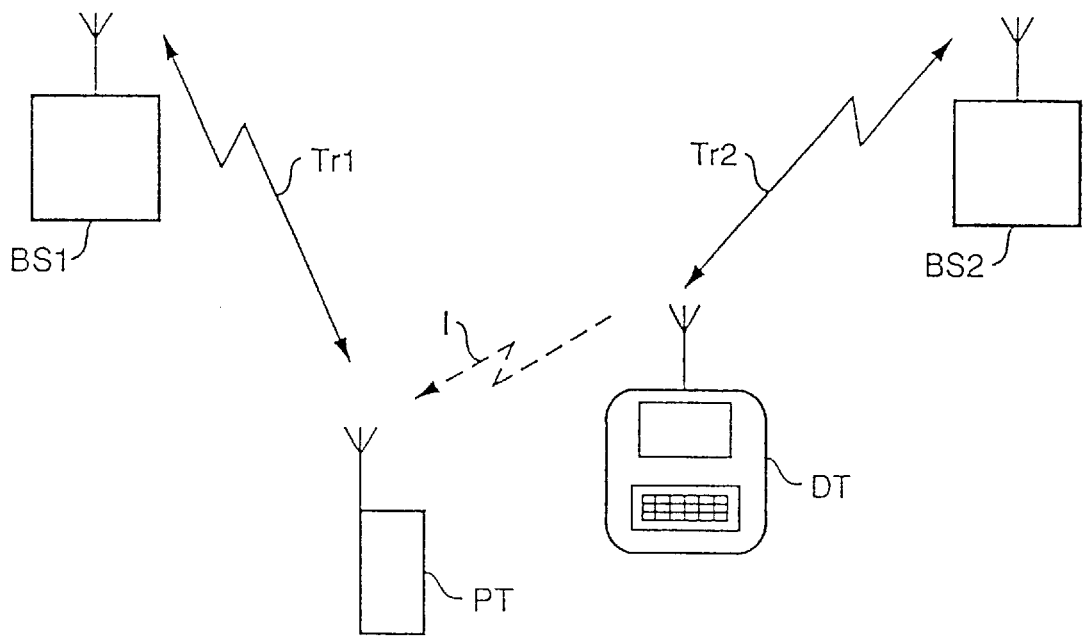

FIG. 1 shows a simplified block diagram of two systems for synchronous and asynchronous radio transfer. Each of the radio systems in the present case comprises a base station BS1 and BS2, one of which communicates with a portable telephone PT whereas the other communicates with a mobile data terminal DT. The two terminals PT and DT are physically located near each other and can therefore interfere with each other, as illustrated by the dashed radio signal I.

The two terminals PT and DT can, for example, be installed in the same place in an office building at a small mutual distance (0.4 m). Both terminals are also at a short distance from the base stations BS1 and BS2. By a short distance in this connection is meant 10–200 m, that is, significantly shorter than the maximum distances at which a mobile subscriber in a cellular system can be from a base station (up to 30 km).

The first transfer Tr1 is synchronous and is used by the portable telephone PT, which transmits to the base station BS1 working synchronously, and receives radio signals from this base station within a certain frequency band and time divided according to the TDD principle. This means that, in addition to a certain frequency being reserved for the synchronous transfer, a certain time slot in each frame is also reserved for transmission from the terminal PT and one time slot for reception a certain time interval after transmission within the same frame (see FIG. 3).

The base station BS1 can communicate synchronously with other portable telephones (not shown) on other frequencies and in other time slots. The base station BS1 is synchronized with other base stations (not shown) in the synchronous system, with regard to frames and time slots.

The second transfer Tr2 is an asynchronous transfer used by the data terminal DT. This terminal transmits to the base station BS2 working in an asynchronous way and receives radio signals from this base station within a certain frequency band but the transmission is not periodic as for the terminal PT but random in time. As for the base station BS1, radio signals are transmitted and received by the base station BS2 on a frequency within a certain frequency band. The transfer Tr2 is, for example, a packet switched data transfer.

The base stations BS1 and BS2 may be arranged within or outside the building and have permanent connections to a private or public network (not shown).

Figure 2:
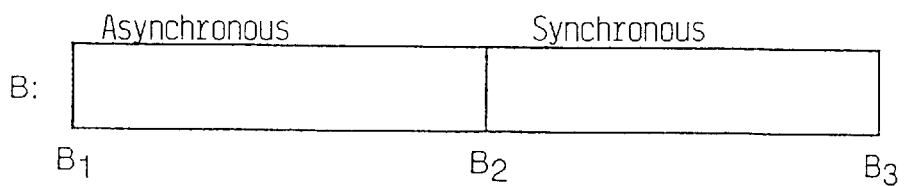

FIG. 2 shows, schematically, the two frequency bands for the synchronous and the asynchronous transfer Tr1, Tr2. Within the band delimited by borders B1 and B2 only asynchronous transfer Tr2 takes place, and within the band delimited by borders B2 and B3 only synchronous transfer Tr1 takes place. In the USA the frequency spectra have been specified as 1910–1920 MHz and 1920–1930 MHz, respectively.

Figure 3:
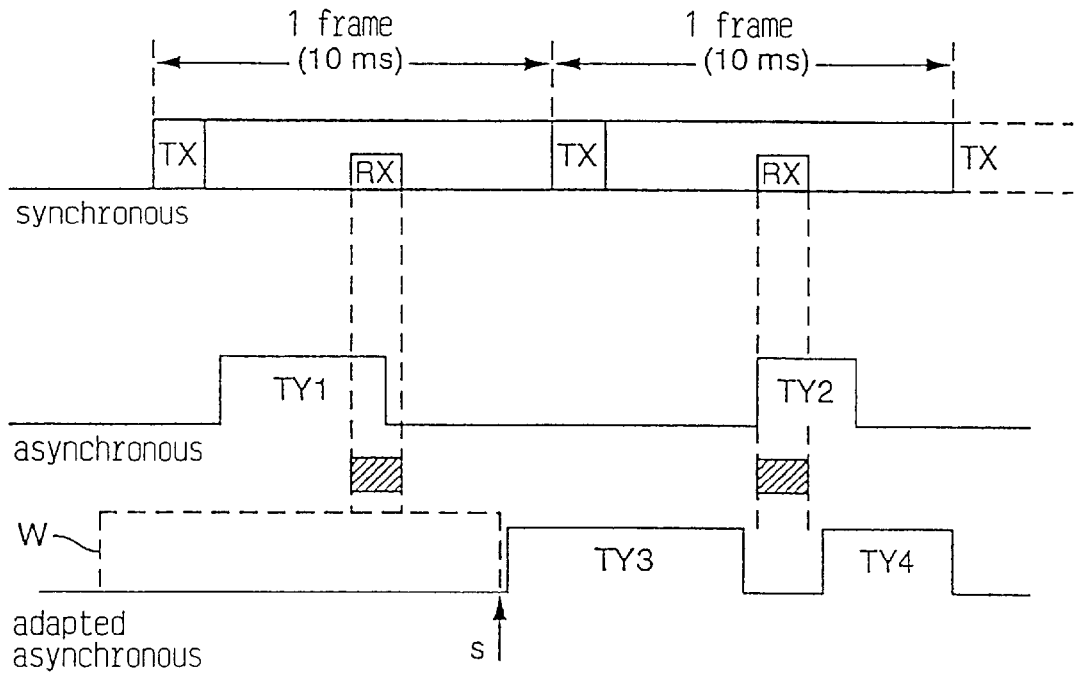
FIG. 3 shows, in a time diagram, an example of a prior art synchronous radio transmission and reception and how asynchronous transmission takes place without and with the inventive method.

The upper diagram of FIG. 3 shows the known principle for TDD transfer of radio signals, which is periodic or synchronous transfer. In this case TDD transfer in a DECT system for personal radio communication (standardized by ETSI) is shown. According to this standard, transmission takes place during a time slot belonging to one half (5 ms) of a frame of length 10 ms, and reception takes place during a time slot belonging to the subsequent half (5 ms) of the same frame. Then transmission and reception again take place during the corresponding time slots belonging to the subsequent frame. The number of time slots should be twelve within each frame half according to standard, but in FIG. 3, for simplicity, only four time slots are shown in the transmission and reception directions. It is of substantial importance for the method according to the invention that the synchronous telephone PT transmits and receives in a synchronous way according to this pattern which is standardized and which is known to the asynchronous terminal DT as well.

In case of a transmission request (arrow S) in the asynchronous terminal DT, this terminal has monitored and stored the field strength during a time W (=19 ms) corresponding to a frame in the synchronous transfer. During this time the asynchronous terminal can thus detect if the adjacent synchronous terminal is transmitting (the TX pulse at the top of the diagram). If the terminal DT detects synchronous transmission, that is, if TX is detected, the terminal DT knows at what time the telephone PT is going to receive, which will be 5 ms later (the pulse RX at the top of the diagram). Regarding the transmission from the asynchronous terminal DT, it may not transmit during the time when the synchronous telephone PT is receiving, as the received pulse RX is the most sensitive to the disturbance from the asynchronous transmission. (TY1, TY2 not allowed; TY3, TY4 possible after W).

The interval ("window W") of 10 ms which the terminal is to monitor in order to find out if any synchronous transmission is going on, is already known to the asynchronous terminal DT, since an asynchronous terminal always has the receiver activated when it is not transmitting, in order to be able to receive asynchronous messages, which may arrive at the terminal at any time.

The terminal DT thus registers the history of the synchronous transmission during a time window W (10 ms) corresponding to one frame. Transmission of the first asynchronous packet may only proceed in the time interval up to the reception in the subsequent frame. A new monitoring is not necessary, since the terminal DT knows when the next allowed interval will occur. In this way the asynchronous transmission continues until it is ended.

Figure 4:
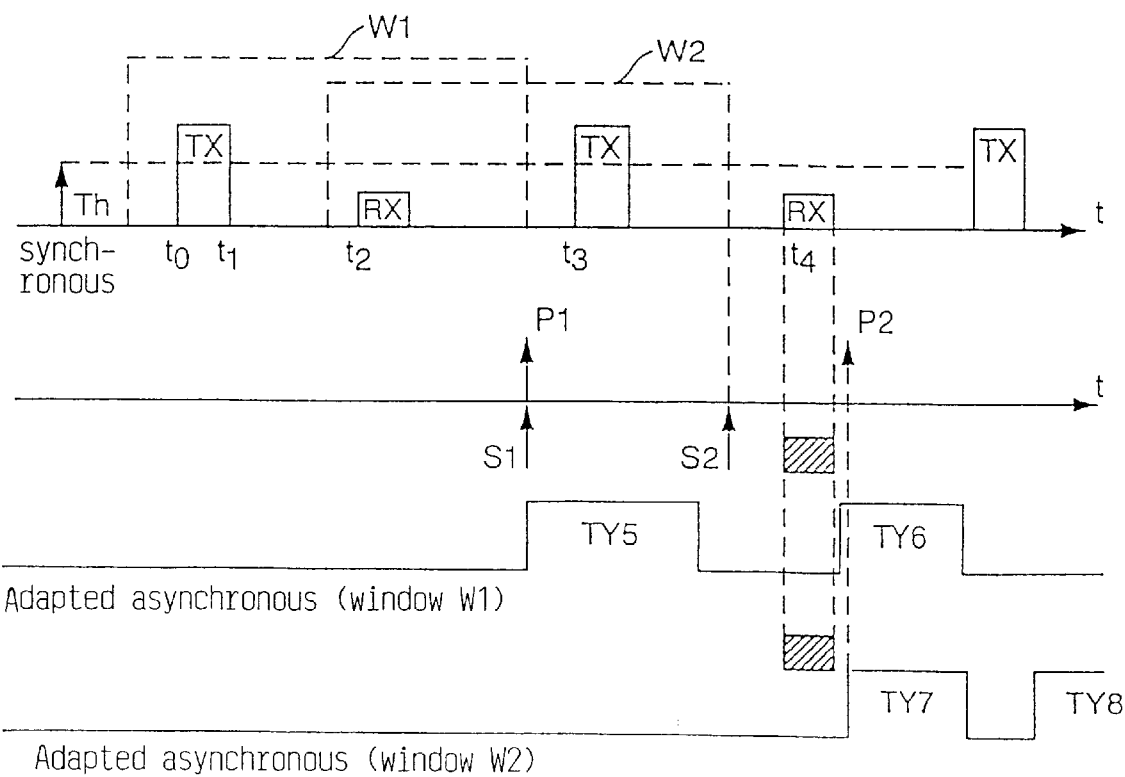
FIG. 4 shows a time diagram of the scanning performed by the asynchronous transceiver according to the inventive method and the activation of the transmitter unit.

FIG. 4 shows the monitoring, and the activation of the asynchronous terminal DT for transmission, in more detail in a time diagram.

The window W during which monitoring takes place can take different positions relative to the transmission/reception pulses in the synchronous telephone PT. In one case the window W=W1 has a position such that the transmission pulse is detected, because its field strength is sufficiently high relative to the threshold Th defined for the monitoring. In the second case, the window W=W2 has a position such that the receive pulse occurs before the transmission pulse, but the receive pulse is not detected, because it, field strength is not sufficiently high relative to the threshold Th. The asynchronous terminal in both cases detects only the transmission pulse and thus an unambiguous detection of the point in time at which the synchronous terminal PT transmits is obtained, whereby the reception time can be determined.

In the first case (window W1) an activation pulse P1 is transmitted to the transmission circuits of the asynchronous terminal immediately after the transmission request S1, since it was found that the transmission of the synchronous terminal was at the beginning of the window W1.

The activation pulse P1 initiates the transmission of the first data packet TY5 in the asynchronous transmitter. Since the asynchronous terminal knows when the receive pulse RX to the receiver of the synchronous terminal arrives, the start time for the second data packet TY6 can be given, for example, immediately after the receive pulse RX.

In the second case (window W2) an activation pulse P2 is only emitted to the transmission circuits; of the terminal a certain time after the transmission request S2 to await the synchronous reception RX and transmission of the first data packet TY7 occurs after the synchronous reception RX. As in the previous case (window W1) the asynchronous terminal knows when the receive pulse RX to the synchronous terminal arrives and can therefore determine when the data packets are to be transmitted. In this case the packet TY8 can be transmitted immediately after the transmission of the first packet TY7.

It is, however, also possible, as shown in FIG. 4, to avoid simultaneous transmission from the synchronous and the asynchronous terminal to avoid any disturbances of the reception in the base stations BS1, BS2 when the frequency spacing of the transmitters is small, for example, when frequencies near the border B2 in FIG. 2 are used.

It may also occur that a received pulse exceeds the threshold value Th when the base station BS1 is very close to the terminal DT, which leads to the terminal DT not knowing what is RX or TX in the synchronous transfer. In this case, too, it is feasible to avoid transmission during both RX and TX in the synchronous transfer.

There is another case that must be considered when setting up the method according to the invention. If more than one synchronous transfer takes place near the asynchronous terminal DT, there may be more than one pulse TX exceeding the threshold value Th. A common rule for all these cases is to inhibit the asynchronous transmission from DT during time intervals in which TX and RX pulses have been found to exceed Th during the preceding 10 ms monitoring period.

Figure 5:
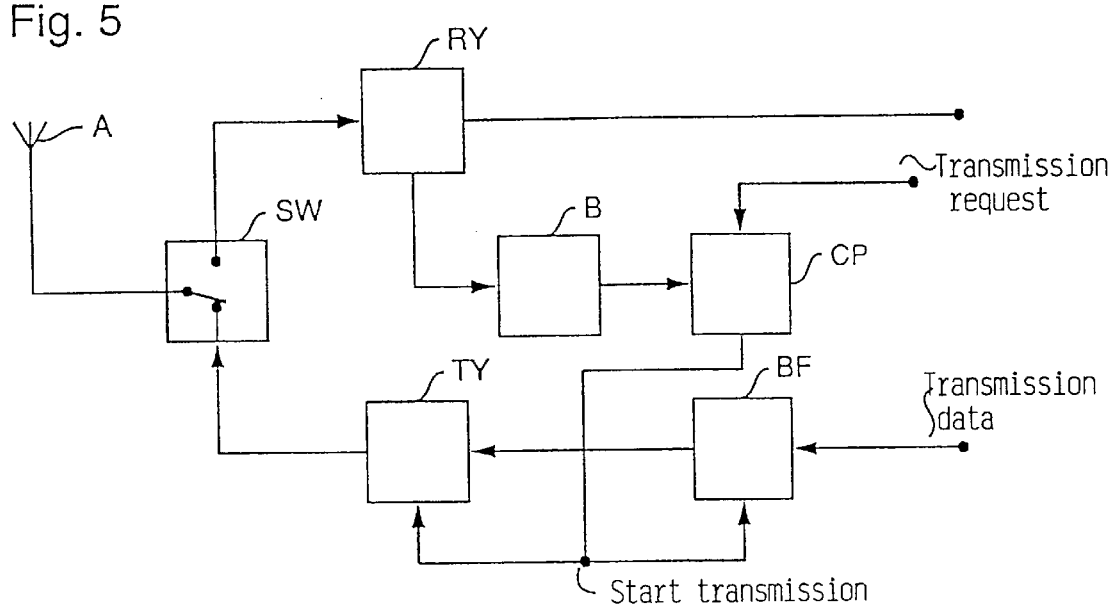
FIG. 5 is a block diagram of an asynchronous transceiver unit applying the method according to the invention.

FIG. 5 shows a transmitter/receiver for asynchronous transmission and reception, for example a mobile data terminal DT as shown in FIG. 1, which applies the method according to the invention.

The terminal has a transceiver antenna A, connected to a switch SW for switching to a radio transmitter TY and to a radio receiver RY. These units are well known in the art and are therefore not described in more detail. The terminal has a central processor CP (microprocessor) controlling the processes in its transmitter and receiver circuits. A buffer unit BF is arranged in a way known in the art, before the transmission unit TY to be able to store transmission data before radio transmission over the antenna A until transmission can take place.

The block B represents the units needed to detect and determine the start and stop times for the asynchronous transfer according to the invention.

The receiver RY periodically samples the electromagnetic field surrounding the asynchronous terminal and emits a value to the unit B to enable to the central processor CP in the terminal to determine the start time for any synchronous transmitter PT located in the near vicinity (for example 0.4 m) of the asynchronous terminal DT according to FIG. 1.

As long as the detected value RSSI of the electromagnetic field around the synchronous terminal is less than the threshold value Th, the block B is not activated.

If the value of RSSI exceeds the threshold value Th according to FIG. 4, the time for this is registered in the block B, and at the same time it is registered for how long time the field strength RSSI is higher than the threshold value Th. The block B can thus both detect the time of an incoming pulse and determine whether or not this pulse was a transmission pulse from a synchronous transmitter, as its width was detected. If this precondition for a synchronous transmission pulse is fulfilled, an activation pulse is sent to the central processor CP. In the central processor CP the time interval between transmission and reception known to be valid for synchronous transfer (5 ms) is stored, and in this way the processor CP can calculate the time intervals in which synchronous reception does not occur and thus also the time intervals in which the asynchronous transmission can take place.

The central processor CP can now transmit activating pulses P1 and P2 according to the diagram of FIG. 4 to the buffer unit BF and to the radio transmitter TY in each of the two shown cases of asynchronous transmission.

Figure 6:
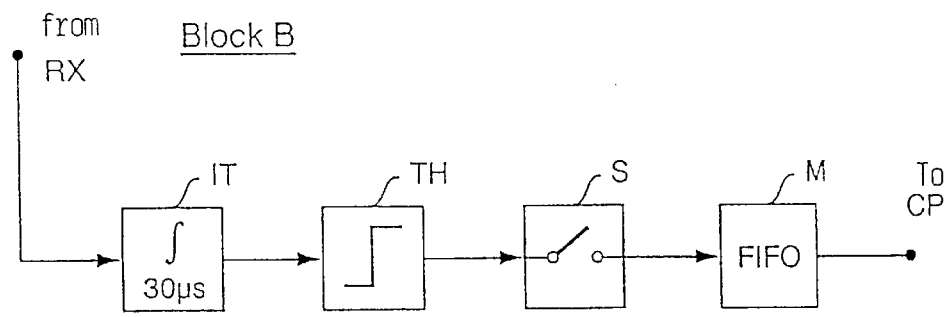
FIG. 6 is a more detailed block diagram of one of the blocks shown in FIG. 5.

FIG. 6 shows in more detail an embodiment of the block B as shown in FIG. 5. It comprises an integrator IT, a threshold unit TH, a sampling unit S and a memory unit M. The threshold unit TH detects the output signal from the integrator IT and emits a corresponding signal if the value of the output signal exceeds a certain threshold value.

The sampling unit S samples the signal emitted from the threshold unit once during each of the time intervals equal to the integration interval for the integrator IT (=30 μs) and digitizes the samples obtained to form binary ones and zeros. A binary "one" is emitted to the memory unit M if the input signal to the threshold unit TH was above the threshold value, in the opposite case a "zero" is emitted to the memory unit M. This unit is a so called FIFO unit, which stores a number of binary values for a certain period of time and then emits these values starting with the one that was first stored, according to the principle "first in, first out". The output signal from the memory unit M is fed to the central processor CP.

Figure 7:
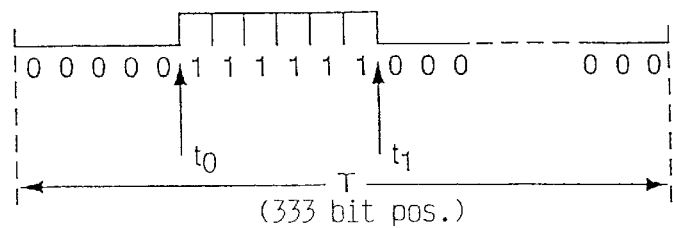
FIG. 7 is a time diagram of the storing in a memory unit comprised in the block according to FIG. 6.

On the input to the integrator IT a signal occurs, the value of which represents the detected field strength RSSI around the asynchronous terminal DT caused by the transmission and reception of other terminals. This value is integrated during a certain, short, period of time (30 μS) corresponding to the time during which monitoring is performed. The integrated value is emitted to the unit TH which, according to the above, emits a high signal level if the signal from the integrator is sufficiently high, that is, if a relatively high field strength is detected. In the opposite case the signal level from the unit TH is zero. The sampling unit S samples the incoming signal at a rate corresponding to the integration time, that is, 30 μs, and according to the above a pulse train is obtained to the memory unit M comprising zeros if no sufficiently high field strength has been detected and ones if a sufficiently high field strength has been detected. Each bit in the bit flow thus has a length equal to 30 μs. FIG. 7 is a time diagram of how the storage of bits is done in the memory unit M and thus the history for the time T for a window W.

The memory unit has a memory length equal to the time interval of a window, that is, T=10 ms. The memory length then becomes 10/0.03=333 bit positions for a window W1 or W2 in FIG. 4. The memory unit M thus stores 333 bits at a time for each 10 ms window regarding the terminal DT. If the duration of the interval t0–t1 in FIG. 7 during which ones occur, equals the known value of the time for transmission TX from the synchronous terminal PT, a control signal is emitted to the processor CP registering both the point in time of the first one pulse to the memory unit M and the remaining time until the synchronous receiving pulse RX is expected to occur.

Since the memory unit M is a FIFO memory, the time t0 is stored for the first of the ones exceeding the threshold value during a specified time t0–t1. Logic and calculation circuits in the processor CP can hereby compute the start point for the synchronous transmission and emit a start signal for transmission to the buffer unit BF and the transmission unit TY in the terminal. The logic in the processor CP can also compute the time, or the time intervals, during which the asynchronous transmission can take place and therefore transmits stop signals to the buffer unit BF and the transmitter unit TY in accordance with the time diagram of FIG. 4.

The design of the logic and calculation circuits comprised in the processor CP and used to compute time intervals for the synchronous transmission and the start time for the synchronous reception is obvious to the skilled person and is therefore not shown in detail here.

What is claimed is:

1. A method for the asynchronous transmission in a frequency band intended for such transfer, within which rules for synchronous transfer are also applied, and taking place at a short distance from the synchronous reception, the synchronous transfer taking place periodically within certain active time intervals, comprising the steps of
   a) storing information about when the reception associated with the synchronous transfer takes place relative to when transmission takes place and when transmission again occurs in accordance with a prescribed rule for the synchronous reception, thus obtaining a sequence of events for said synchronous transfer;
   b) before an asynchronous transmission is initiated, monitoring the state of the synchronous reception during a time interval at least equal to the period for which the synchronous (Tr1) transfer takes place, and storing said state during said time interval;
   c) detecting the transmission point in time for the synchronous transfer during said time interval during the monitoring; and
   d) based on the sequence of events known according to a) and the transmission point in time detected according to c), calculating the time intervals in which no synchronous transfer takes place, the transmission time for the asynchronous transfer being determined so that this transmission time does not coincide with the time for the synchronous reception.

2. A method according to claim 1,
   wherein the calculation carried out according to d) also concerns the transmission intervals for the synchronous transfer so that asynchronous transmission is inhibited during the receive intervals and the transmission intervals of the synchronous transfer.

3. A method according to claim 1,
   wherein the state monitored according to b) involves the measuring of the time and the electrical field strength taken into account at the asynchronous transfer, the variations in said field strength being registered in order to determine when, according to d), no synchronous reception is taking place.

4. A method according to claim 3,
   wherein the measured field strength is separated above and below a certain threshold value, which has been selected so that interference of a synchronous transmission on the asynchronous reception can be registered and the point in time when the corresponding synchronous reception occurs can thus be determined.

5. A method according to claim 4,
   wherein the duration of a signal obtained from the separated field strength is compared to a known value of the duration of a transmission signal in the synchronous transfer, whereby the transmission point in time is detected by determining the start time of said signal.

6. An apparatus comprised in an asynchronous radio terminal comprising transmitter and receiver units,
   a) monitoring means to monitor the electric field strength at the asynchronous terminal, whereby, if said field strength exceeds a certain value a first activation signal is generated, the duration of which is equal to the time during which the electric field strength exceeds said value;
   b) registering means for registering the point in time when said first activation signal is emitted and for, from its duration, determining if the received first activation signal was caused by a synchronous transfer, and, if this is the case, registering the point in time of this transfer, thus causing a second activation signal is emitted;

c) processor means storing the characteristics of the synchronous transfer in order to calculate, based on the characteristics of the synchronous transfer, the time intervals during which transmission from the asynchronous terminal is to take place, so that said time intervals do not coincide with the synchronous reception.

7. An apparatus according to claim 6, wherein said processor means is adapted to be activated by a transmission request signal from the asynchronous terminal, said transmission request together with the calculated time intervals activating the transmission from the asynchronous terminal.

8. A radio communication system comprising radio base stations, a synchronous radio terminal comprising a transmitter/receiver and an asynchronous radio terminal comprising a transmitter/receiver, said two terminals being arranged at a short distance from each other and both communicating with said radio base stations through a radio medium, said asynchronous terminal comprising a) memory means for storing information about when reception on the synchronous unit takes place relative to when transmission takes place and when transmission again takes place from the synchronous unit;

b) means for monitoring, before transfer is initiated from the asynchronous unit, the state of the synchronous unit during a certain time interval, to form an indication of said state;

c) detection means for detecting the point in time for the synchronous unit in dependence of the state formed in accordance with b); and d) calculating means for calculating, based on the interval known according to a) and the point in lime detected according to c), the time intervals in which no transfer is taking place for the synchronous terminal, the transmission intervals for the asynchronous unit being determined so that said transmission intervals do not coincide with the synchronous reception.

\* \* \* \* \*